(12) United States Patent
Batta et al.

(10) Patent No.: US 12,717,880 B2
(45) Date of Patent: Aug. 25, 2026

(54) GENERATING CHANGE REQUEST CLASSIFICATION EXPLANATIONS

(71) Applicant: International Business Machines Corporation, Armonk, NY (US)

(72) Inventors: Raghav Batta, San Jose, CA (US); Michael Elton Nidd, Zurich (CH); Larisa Shwartz, Greenwich, CT (US); Pritam Gundecha, San Jose, CA (US); Rama Kalyani T. Akkiraju, Cupertino, CA (US); Amar Prakash Azad, Bangalore (IN); Harshit Kumar, Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1099 days.

(21) Appl. No.: 17/363,087

(22) Filed: Jun. 30, 2021

(65) Prior Publication Data

US 2023/0004761 A1 Jan. 5, 2023

(51) Int. Cl.
*G06F 8/71* (2018.01)
*G06F 18/214* (2023.01)
(Continued)

(52) U.S. Cl.
CPC .......... *G06F 18/241* (2023.01); *G06F 18/214* (2023.01); *G06F 18/2431* (2023.01); *G06N 20/00* (2019.01)

(58) Field of Classification Search
CPC ............... G06F 18/241; G06F 18/2411; G06F 18/2431; G06F 18/24133; G06F 18/24137;
(Continued)

(56) References Cited

U.S. PATENT DOCUMENTS 9,448,787 B2 9/2016 Rosomoff
10,523,682 B1 12/2019 Badawy
(Continued)

OTHER PUBLICATIONS

Kadar et al., “Automatic Classification of Change Requests for Improved IT Service Quality,” 2011 Annual SRII Global Conference, San Jose, CA, USA, 2011, pp. 430-439, doi: 10.1109/SRII.2011.95. (Year: 2011).*
(Continued)

*Primary Examiner* — Kamran Afshar
*Assistant Examiner* — Steven Phung
(74) *Attorney, Agent, or Firm* — CHIP LAW GROUP

(57) ABSTRACT

An approach for generating actionable explanations of change request classifications may be presented. A model may generate features associated with a change request may be disclosed. The model may be trained with historical change requests that have been labeled risky or not risky. The change request may be classified as risky or not risky. Candidate historical change requests with the same classification as the change request and occupying similar feature space as the change request may be identified from a historical change request repository. One or more features which had the most significant impact on the classification may be identified. A candidate historical change request with at least one significant feature impacting classification may be identified.

20 Claims, 7 Drawing Sheets

(51) Int. Cl.

| | |
|---|---|
| ***G06F 18/241*** | (2023.01) |
| ***G06F 18/2431*** | (2023.01) |
| ***G06N 3/0455*** | (2023.01) |
| ***G06N 3/09*** | (2023.01) |
| ***G06N 20/00*** | (2019.01) |

(58) Field of Classification Search

CPC ........... G06F 18/2414; G06F 18/24143; G06F 18/24147; G06F 18/2415; G06F 18/24155; G06F 18/2413; G06N 20/00; G06N 20/10

See application file for complete search history.

(56) References Cited

U.S. PATENT DOCUMENTS

| | | | | |
|---|---|---|---|---|
| 11,290,325 | B1 * | 3/2022 | Kaluza | H04L 41/0853 |
| 11,968,224 | B2 | 4/2024 | Hwang et al. | |
| 2019/0108465 | A1 * | 4/2019 | Zhou | G06Q 10/06375 |
| 2019/0130050 | A1 * | 5/2019 | Haas | G06F 16/90344 |
| 2019/0347282 | A1 * | 11/2019 | Cai | G06N 5/022 |
| 2020/0067798 | A1 | 2/2020 | Kalia | |
| 2020/0120128 | A1 | 4/2020 | Tamir | |
| 2020/0265341 | A1 * | 8/2020 | Bhatt | G06N 20/10 |
| 2020/0285558 | A1 | 9/2020 | Kalia | |
| 2020/0293310 | A1 | 9/2020 | Mittell | |
| 2021/0097132 | A1 * | 4/2021 | Dimanov | G06N 3/0464 |
| 2021/0103840 | A1 * | 4/2021 | Kwong | G06N 20/00 |
| 2022/0044328 | A1 * | 2/2022 | Ligon | G16H 10/60 |

OTHER PUBLICATIONS

"20 key risks to consider by Internal Audit before 2020", KPMG, Jan. 2020, 28 pages.

"Astute Move Risk Mitigator for Move Request Management", An IP.com Prior Art Database Technical Disclosure, Authors et. al.: Disclosed Anonymously, IP.com No. IPCOM000265040D, IP.com Electronic Publication Date: Feb. 20, 2021, 3 pages.

"IBM Cloud Pak for Watson AIOps 3.1 helps SREs and IT teams to maintain a high availability of applications and helps remediate and resolve incidents through automation", IBM Europe Software Announcement ZP21-0130, Apr. 27, 2021, 5 pages, <https://www-01.ibm.com/common/ssi/ShowDoc.wss?docURL=/common/ssi/rep_ca/0/877/ENUSZP21-0130/index.html&request_locale=en>, Grace Period Disclosure.

"IBM Cloud Pak for Watson AIOps", IBM, downloaded from the internet on Jun. 23, 2021, 11 pages, <https://www.ibm.com/cloud/cloud-pak-for-watson-aiops?cm_sp=Scheduler-_-CopyChng2-_-C>.

"Method and system for using AI to validate AI and human visualisation insights", An IP.com Prior Art Database Technical Disclosure, Authors et. al.: Disclosed Anonymously, IP.com No. IPCOM000263710D, IP.com Electronic Publication Date: Sep. 29, 2020, 4 pages.

"System and Method to Provide Cognitive Remediation Insights for Continuous Operations in Managing an Application with Mobile and Edge Devices which Can Experience Unplanned Outages Resulting in Loss of Business", An IP.com Prior Art Database Technical Disclosure, Authors et. al.: Disclosed Anonymously, IP.com No. PCOM000264548D, IP.com Electronic Publication Date: Jan. 5, 2021, 11 pages.

Batta, et al., "Discovery of an Inexplicit Link Between a Change and an Incident in a Computing Environment", U.S. Appl. No. 17/189,974, filed Mar. 2, 2021.

Batta, et al., "Risk Assessment of a Proposed Change in a Computing Environment", U.S. Appl. No. 17/150,657, filed Jan. 15, 2021.

Belharet et al. "Report on the Impact of Artificial Intelligence on Project Management", Deliverable submitted towards the award of the Master's Degree, Date of Submission: Jun. 30, 2020, 54 pages.

Guven et al., "COACH: COgnitive Analytics for CHange", 2017 IFIP/IEEE International Symposium on Integrated Network Management (IM2017): Experience Session—Full Paper, pp. 720-725.

Mell et al., "The NIST Definition of Cloud Computing", Recommendations of the National Institute of Standards and Technology, Special Publication 800-145, Sep. 2011, 7 pages.

Mirhoseini et al.; "Network Security: Artificial Intelligence method for Attack Detection (Survey Study)", 3rd National Conference on Computer, information technology and applications of artificial intelligence, Feb. 5, 2020, 13 pages.

Stanley et al., "Distributed Ensemble Learning for Provisioning Indices, Actions, and Inputs for Assurance and Performance", An IP.com Prior Art Database Technical Disclosure, IP.com No. PCOM000252743D, IP.com Electronic Publication Date: Feb. 6, 2018, 12 pages.

Ribeiro et al., ""Why Should I Trust You?" Explaining the Predictions of Any Classifier", Proceedings of the 22nd ACM SIGKDD International Conference on Knowledge Discovery and Data Mining, Aug. 13, 2016, pp. 1135-1144, doi: https://doi.org/10.1145/2939672.2939778.

Williams et al, "Change Risk Assessment: Understanding Risks Involved in Changing Software Requirements", Software Engineering Research and Practice, Jan. 2006, 7 pages, vol. 2.

* cited by examiner

200

104
Change Request Risk Explanation Engine

202
Natural Language Preprocessing Module

204
Change Risk Feature Generation Module

206
Risk Classification Module

208
Feature Explanation Module

GENERATING CHANGE REQUEST CLASSIFICATION EXPLANATIONS

STATEMENT REGARDING PRIOR DISCLOSURES BY THE INVENTOR OR JOINT INVENTOR

The following disclosure(s) are submitted under 35 U.S.C. 102(b)(1)(A) as prior disclosures by, or on behalf of, a sole inventor of the present application or a joint inventor of the present application.

An embodiment of the present invention was incorporated into IBM Cloud Pak® for Watson AlOps, v.3.1 and released on Apr. 27, 2021.

BACKGROUND OF THE INVENTION

The present invention relates generally to the field of machine learning and artificial intelligence, more specifically to generating explanations of classifications for change requests in a technical system.

Open systems are highly dependent on the environment. Changes to the environment in which a system operates can affect the system as much as a change to the system itself. A computer program or application itself is an open system with interactions and dependencies on infrastructure, operational management processes, and other concurrently running applications.

Many incidents in a computer system are the result of a change to the environment of the system. For example, source code changes, system configuration changes, hardware changes, and security protocol changes can cause a cascade reaction of unforeseen technical issues. Even technical changes to a system that are considered successful can lead to technical issues at a later time.

A change request can be classified as risky or problematic in some cases. However, this classification oftentimes leaves a user unable to determine why the change request is classified. An explanation of what lead to the risky or problematic classification and/or issues the change request could potentially cause could lead a user to make a more informed decision when it comes to implementing a change request.

SUMMARY

Embodiments of the present disclosure include a computer-implemented method computer system, and computer program product for generating change risk classification explanations. The embodiments include extracting a plurality of features from a change request, based on a trained model. The embodiments further include classifying the change request as risky or not risky, based on the extracted features. The embodiments further include identifying one or more candidate historical change requests with at least one similar feature as the change request and with the same classification as the change request. The embodiments further include detecting which features of the change request had the most significant impact on the classification of the change request. The embodiments further include analyzing the relevance of the candidate historical change requests, based on the detected features that had the most significant impact on the classification of the change request. The embodiments further include identifying a relevant candidate historical change request, based on the analysis.

Figure 1:
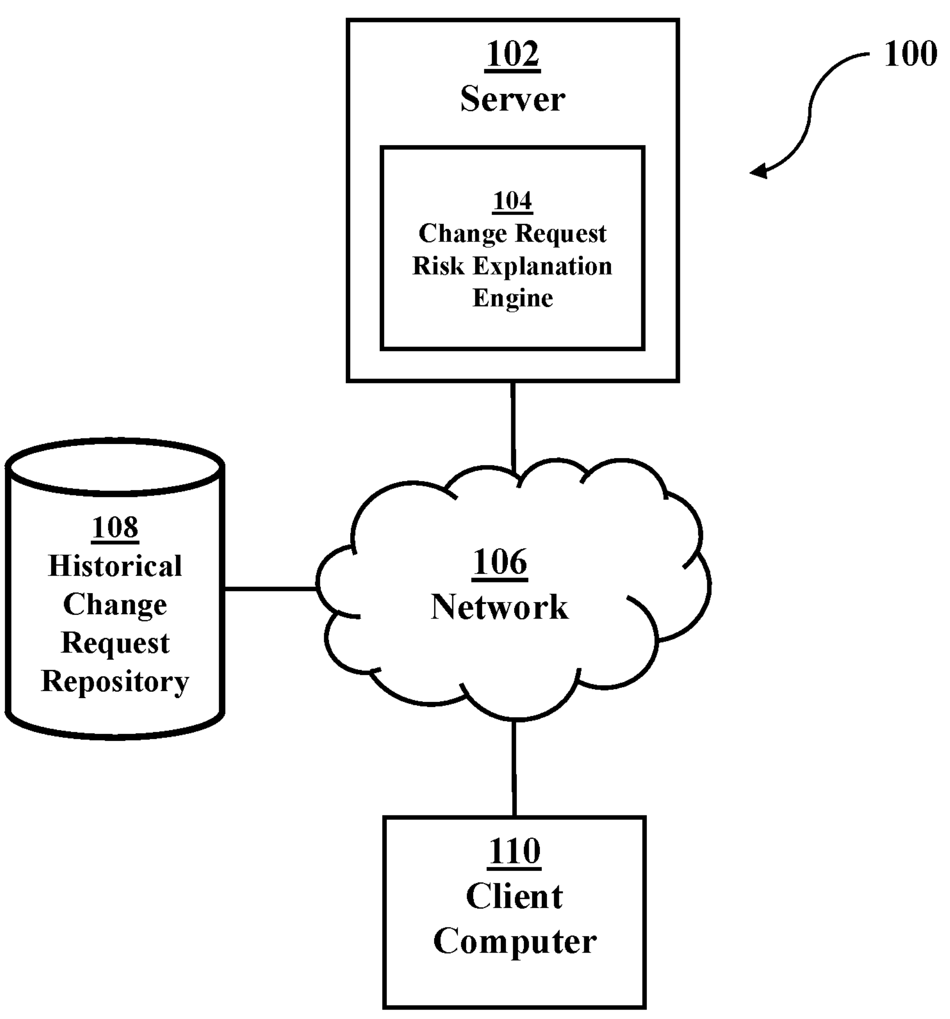
FIG. 1 is a functional block diagram of a change request classification explanation generation environment, generally designated 100, in accordance with an embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Embodiments presented herein recognize the need for generating an explanation of a classification for a change request for a machine learning model. Current techniques of risk determination are based on explicit rule sets, where if a change request is classified as risky, the explanation would be based on which rule had been violated by the change request. Throughout this description, the term risky is used for simplicity. "Risky" is used in the sense that a change request may cause future issues. This classification is based on historical data of other similar change requests that caused issues. Risky issues, or simply issues, can be any event in a system that prevents it from operating in its intended manner and/or require technical troubleshooting. Conversely, non-risky issues, or simply no issues, can be representative of a system operating in its intended manner and/or in which technical troubleshooting is not required.

Machine learning models can identify patterns associated with historical change requests and classify new change requests based off of similar features. However, determining which features lead to the classification is difficult to obtain due to the nature of machine learning models. Explanations of which features of a new change request lead to a risky or not risky determination are needed.

In an embodiment of the invention, a machine learning classification model can be trained with labeled historical change requests. The machine learning model can extract features associated with the labeled historical change requests. The machine learning model can be applied to a new change request and classify the new change request. In addition to classifying the new change request, features of the new change request can be extracted. The features can be entered into an explainability algorithm to identify which features had the most influence on the classification.

In another embodiment of the invention, labeled historical change requests are fed into an autoencoder, such as a natural language processing model (e.g., bidirectional encoding representations from transformers ("BERT"), word2vec, etc.). The historical change requests are labeled as being associated with future issues upon application of the change request. A classification engine is trained with the output of the natural language processing model historical change requests. A new change request is fed into the natural language processing model and fed into the trained classification model to classify the new change request as potentially having issues upon future application of the change request.

Referring now to the Figures, FIG. 1 is a functional block diagram generally depicting change request risk explanation generation environment 100. Change request risk explanation generation environment 100 comprises change request risk explanation engine 104 operational on server 102, client computer 110, and historical change request repository 108, all interconnected over network 106.

Server 102 and client computer 110 can be a standalone computing device, a management server, a web server, a mobile computing device, or any other electronic device or computing system capable of receiving, sending, and processing data. In other embodiments, server 102 and client computer 110 can represent a server computing system utilizing multiple computers as a server system such as in cloud computing environment 50 (depicted in FIG. 6). In an embodiment, server 102 and client computer 110 can represent a computing system utilizing clustered computers and components (e.g., database server computers, application server computers, etc.) that act as a single pool of seamless resources when accessed within change request risk explanation generation environment 100. In another embodiment, server 102 and client computer 110 can be a laptop computer, a tablet computer, a netbook computer, a personal computer, a desktop computer, or any programmable electronic device or combination of programmable electronic devices capable of executing machine readable program instructions and communicating with each other and other computing devices (not depicted) within change request risk explanation generation environment 100 via network 106. It should be noted, while only server 102 and client computer 110 are shown in FIG. 1, in other embodiments, multiple servers or other computing devices can be present within change request risk explanation generation environment 100.

Figure 5:
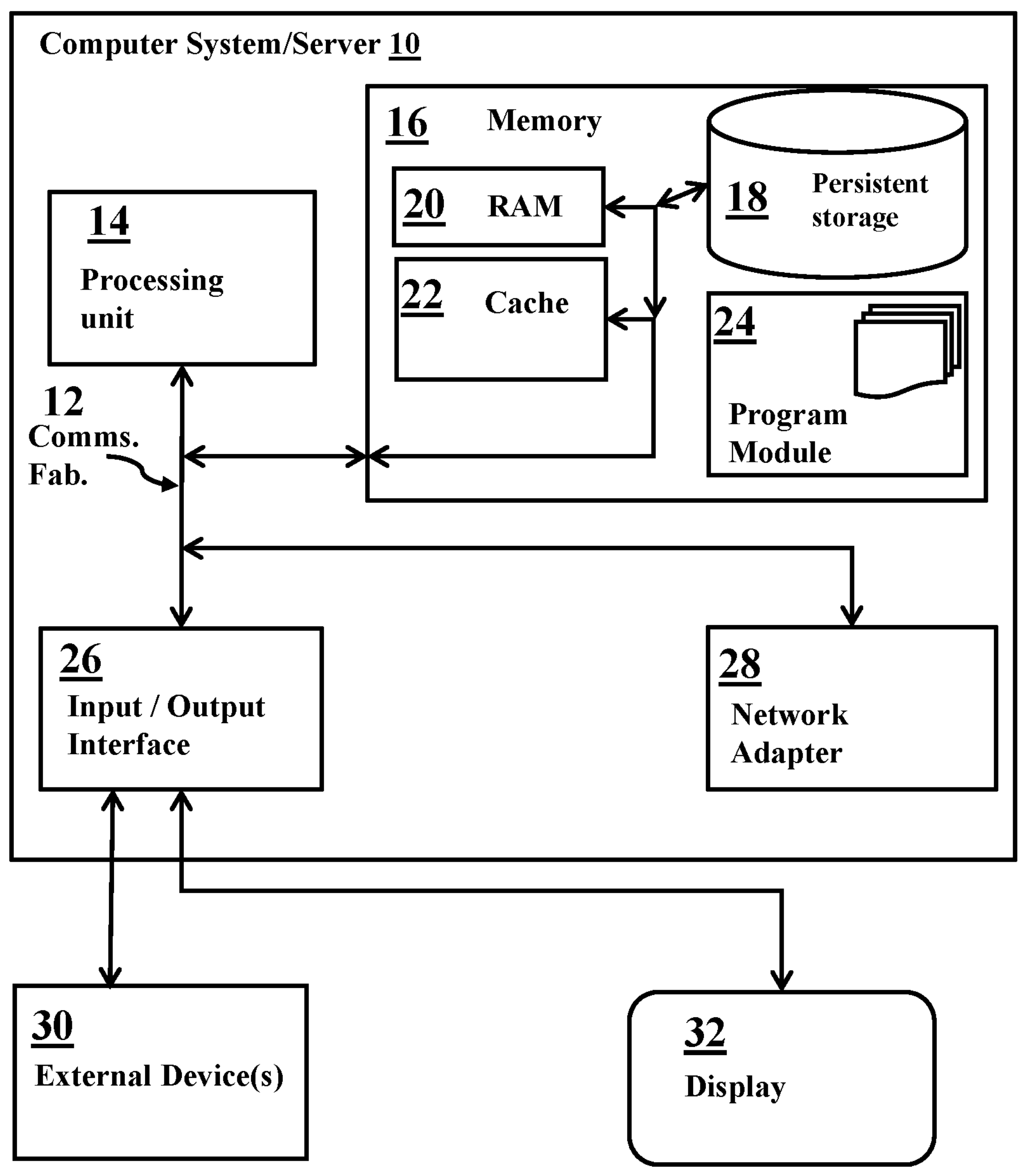
FIG. 5 is a functional block diagram of an exemplary computing system 10 within a change request classification explanation environment, in accordance with an embodiment of the present invention.

Server 102 client computer 110 may include components as depicted and described in further detail with respect to computer system 10 in FIG. 5. Server 102 and client computer 110 may include components as depicted and described in further detail with respect to cloud computing node 40 of cloud computing environment 50 in FIG. 6.

Network 106 can be a telecommunications network, a local area network (LAN), a wide area network (WAN), such as the Internet, or a combination of the three, and can include wired, wireless, or fiber optic connections. Network 106 may include one or more wired and/or wireless networks that are capable of receiving and transmitting data, voice, and/or video signals, including multimedia signals that include voice, data, and video information. In general, network 106 can be any combination of connections and protocols that will support communications between server 102, historical change request repository 108, client computer 110, and external computing devices (not shown) within change request risk explanation generation environment 100.

Change request risk explanation engine 104 is a computer program capable of determining whether a new change request will be considered risky and providing an explanation on how that determination was made. In an embodiment, change request risk explanation engine 104 can be multiple computer modules that receive a new change request and analyze the new change request identifying features of the change request. Based on the features of the change request, the change request can be classified as risky or not risky. If the change request is classified as risky, change request risk explanation engine 104 can identify similar historical change request candidates based on similarities of the features. Change request risk explanation engine 104 can detect which features had the most impact on the classification of the new change request. Using the detected features, change request risk explanation engine 104 can identify a candidate historical change request with the most similar features detected to have the most impact on classification. The identified historical change request candidate can be presented to a user with which features of the historical change request candidate resulted in the classification.

In an embodiment, change request risk explanation engine 104 can be a machine learning model comprised of multiple models, which can be configured to perform the following operations: (i) extracting features from a received change request, (ii) classifying the received change request based on the extracted features, (iii) identifying one or more candidate historical change requests with the same classification and similar features, (iv) detecting which features were the most influential in the classification of the change request, and (v) identifying a historical change request from the candidate historical change requests with similar features associated with the detected features.

Historical change request repository 108 is a database that contains historical change requests and associated information relating to historical change requests. For example, a historical change request can be the request itself in a human readable format (i.e., natural language), either in a structured or unstructured format. Information associated with historical change requests can be, for example, but not limited to, the status of a system prior to implementing the change request, metadata of the change request, features extracted by change risk feature generation module 204 (explained further below), human annotated labels of risky or not risky, and system conditions post change request application.

Figure 2:
FIG. 2 is a functional block diagram of a change risk explanation classification engine, generally designated 200, in accordance with an embodiment of the present invention.

FIG. 2 is a block diagram 200 comprised of change request risk explanation engine 104. Change request risk explanation engine 104 can be comprised of natural language preprocessing module 202, change risk feature generation module 204, risk classification module 206, and feature explanation module 208.

Natural language preprocessing module 202 is a computer module that can be configured to receive change requests in natural language form and process the change request into a format that can be utilized by change risk feature generation module 204. The operations of natural language preprocessing module 202 are described further below in FIG. 3.

Change risk feature generation module 204 is a computer module that can be configured to extract features from a change request. In an embodiment, change risk feature generation module 204 can receive a change request and extract features from the change request based on the language of the change request. For example, change risk feature generation module 204 can have natural language preprocessing model module 202 (described in more detail below FIG. 3) configured to generate word embeddings from the change request.

In another embodiment, change risk feature generation module 204 can be based on a word embedding module that can generate vectors within a vector space. The vectors can represent features of the change risk associated with the meanings of the words within the change risk. For example, a word like "configure" would be embedded near a word like "install." This would signify that the two words have similar meanings. Meanwhile, a word like "test" would be located far from the word "configure" within the vector space, signifying the words are not closely related. The words within change request can be analyzed together or individually by change risk feature generation module 204.

Risk classification module 206 is a computer module that can be configured to classify a change risk. In an embodiment, risk classification module 206 can receive the features from change risk feature generation module 204 and classify a change risk as risky or not risky. Risk classification module 206 can be based on a machine learning model. For example, a deep learning model such as a multi-layer perceptron configured to receive n number of features associated with a change request and output a risky or not risky classification.

Feature explanation module 208 is a computer module that can be configured to identify one or more historical change request candidates from historical change request repository 108 of problematic changes with the same classification and similar features to the new change request. Feature explanation module 208 can also detect which features of the new change request had the largest impact on the classification of the new change request. Based on the detection of the features with the largest impact, feature explanation module 208 can identify a historical change request candidate with the highest overlap of detected impactful features.

In an embodiment, feature explanation module 208 can use a document similarity algorithm to identify historical change request candidates that are similar to the new change request. For example, feature explanation module 208 can find multiple historical change requests within historical change repository using one of the following: latent semantic indexing, elastic search, annoy, etc. . . . The search criteria can include identifying a number of historical change requests with the same classification (e.g., 1, 2, n . . . n+1). From the identification of classification, a template may be used including identifying change requests based on specific trigger words (e.g., configure, reboot, install, terminate, etc.) within the request and analyzing those change requests for feature similarity.

In another embodiment, feature explanation module 208 can detect which features have a significant impact on the new change requests classification. Feature explanation module 208 can comprise an explainability model, such as, local interpretable model-agnostic explanation ("LIME") or deep learning important features ("DeepLIFT"). For example, feature explanation module 208 can identify which weights within a deep learning model have the most impact on classification. Feature explanation module 208 can also pre-cache LIME explainability on training data associated with the historical change requests, due to the resource heavy nature of LIME. This can be used since candidate historical change requests already identified as similar will likely have the same significant features.

Figure 3:
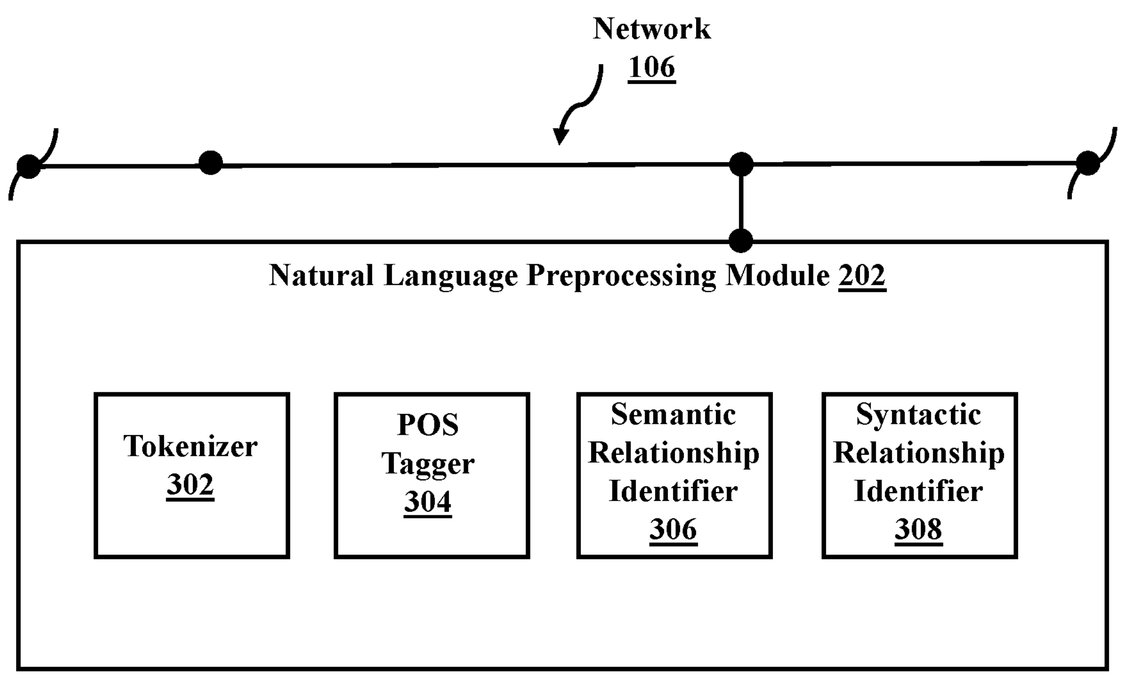
FIG. 3 is a block diagram of natural language preprocessing module 202, generally designated 300, in accordance with an embodiment of the present invention.

Referring now to FIG. 3, shown is a block diagram of an exemplary natural language preprocessing architecture 300, including a natural language preprocessing module 202, configured to analyze change requests to extract features of the change request, in accordance with embodiments of the present disclosure. In some embodiments, a remote device (such as client computer 110 of FIG. 1) may submit a change request to be analyzed by the natural language preprocessing module 202 which may be housed on a host device (such as server 102 of FIG. 1). Such a remote device may include an instance of change request risk explanation engine 104, which may itself involve one or more entities operable to generate or modify information associated with the change request that is then dispatched to a natural language preprocessing module 202 via network 106.

Consistent with various embodiments, natural language preprocessing module 202 may analyze change requests received by change request risk explanation engine 104. Specifically, natural language preprocessing module 202 may preprocess a received at change request risk explanation engine 104 for future feature extraction by change risk feature generation module 204. Natural language preprocessing module 202 may perform various methods and techniques for analyzing change requests (e.g., syntactic analysis, semantic analysis, etc.). Natural language preprocessing module 202 may be configured to recognize and analyze any number of natural languages. Further, natural language preprocessing module 202 may include various modules to perform analyses of change requests. These modules may include, but are not limited to, a tokenizer 302, a part-of-speech (POS) tagger 304 (e.g., which may tag each of the one or more sections in which the particular subject is identified), a semantic relationship identifier 306, and a syntactic relationship identifier 308.

In some embodiments, tokenizer 302 may be a computer module that performs lexical analysis. Tokenizer 302 may convert a sequence of characters (e.g., images, sounds, etc.) into a sequence of tokens. A token may be a string of characters included in a change request and categorized as a meaningful symbol. Further, in some embodiments, tokenizer 302 may identify word boundaries in a change request and break any text within the change request into their component text elements, such as words, multiword tokens, numbers, and punctuation marks. In some embodiments, tokenizer 302 may receive a string of characters, identify the lexemes in the string, and categorize them into tokens.

Consistent with various embodiments, POS tagger 304 may be a computer module that marks up a word in a recording to correspond to a particular part of speech. POS tagger 304 may read a passage or other text in natural language and assign a part of speech to each word or other token. POS tagger 304 may determine the part of speech to which a word (or other spoken element) corresponds based on the definition of the word and the context of the word. The context of a word may be based on its relationship with adjacent and related words in a phrase, sentence, or paragraph. In some embodiments, the context of a word may be dependent on one or more previously analyzed change requests (e.g. a change request previously applied to a system). Examples of parts of speech that may be assigned to words include, but are not limited to, nouns, verbs, adjectives, adverbs, and the like. Examples of other part of speech categories that POS tagger 304 may assign include, but are not limited to, comparative or superlative adverbs, wh-adverbs, conjunctions, determiners, negative particles, possessive markers, prepositions, wh-pronouns, and the like. In some embodiments, POS tagger 304 may tag or otherwise annotate tokens of a recording with part of speech categories. In some embodiments, POS tagger 304 may tag tokens or words of a recording to be parsed by natural language preprocessing module 202.

In some embodiments, semantic relationship identifier 306 may be a computer module that may be configured to identify semantic relationships of recognized subjects (e.g., words, phrases, images, etc.) in a recording. In some embodiments, semantic relationship identifier 306 may determine functional dependencies between entities and other semantic relationships.

Consistent with various embodiments, syntactic relationship identifier 308 may be a computer module that may be configured to identify syntactic relationships in a recording composed of tokens. Syntactic relationship identifier 308 may determine the grammatical structure of sentences such as, for example, which groups of words are associated as phrases and which word is the subject or object of a verb. Syntactic relationship identifier 308 may conform to formal grammar.

Figure 4:
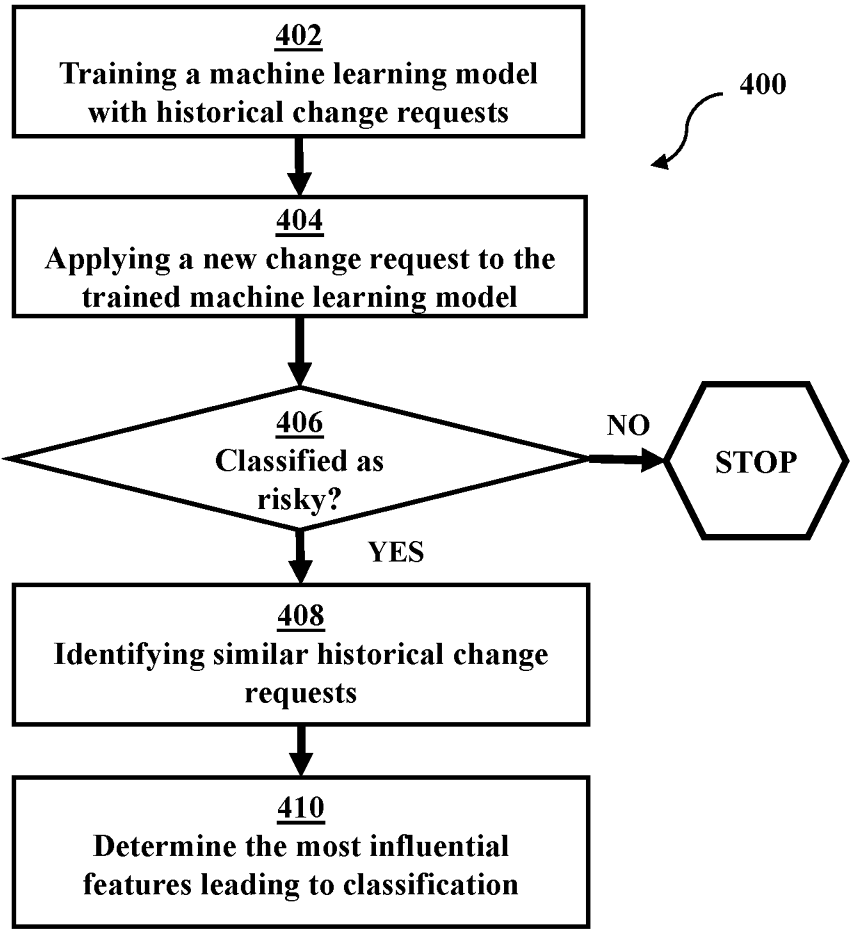
FIG. 4 is flowchart of a method for generating an explanation for change risk classification 400, in accordance with an embodiment of the present invention.

FIG. 4 is a flowchart depicting method 400 for multi-device collaboration authentication, in accordance with an embodiment of the present invention.

At step 402, train a machine learning model with a plurality of change requests. In an embodiment, labeled historical change requests from historical change request repository 108 can be used to train change risk feature generation module 204 and risk classification module 206.

At step 404, apply a new change request to the trained machine learning model. In an embodiment, a change request can be received at change request risk explanation engine 104. The change request can be fed into natural language preprocessing module 202 to change the change request into a computer understandable format. The change request in computer understandable format can be entered into change risk feature generation module 204. Change risk feature generation module 204 can extract features (e.g., vectors) from the change request. The features can be fed into risk classification module 206. Based on the extracted features, risk classification module 206 can classify the change risk as risky or not risky.

At step 406, determine if the change request is classified as risky. In an embodiment, feature explanation module 208 can see if the change request was classified as risky by risk classification module 206.

At step 408, identify historical change requests with similar features. In an embodiment, feature explanation module 208 can analyze historical change request repository to find any candidate historical change requests with similar features. For example, feature explanation module 208 can use Elastisearch or a similar search algorithm to find historical change requests with similar features.

At step 410, determine which features had the most influence on the change request being classified as risky. In an embodiment, feature explanation module 208 can analyze the classification model in risk classification module 206 and determine which features were the most significant in the classification. For example, in a neural network, feature explanation module 208 can utilize the LIME algorithm to determine which nodes in the classification model were activated by the features of the change request.

In an embodiment, feature explanation module 208 can identify a candidate change request with similar features determined to be the most significant in classifying the change request. Feature explanation module 208 can present the change candidate to a user.

FIG. 5 depicts computer system 10, an example computer system representative of servers 102, or any other computing device within an embodiment of the invention. Computer system 10 includes communications fabric 12, which provides communications between processing unit 14, memory 16, persistent storage 18, network adaptor 28, and input/output (I/O) interface(s) 26. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Computer system 10 includes processing unit 14, cache 22, memory 16, network adaptor 28, input/output (I/O) interface(s) 26 and communications fabric 12. Communications fabric 12 provides communications between cache 22, memory 16, persistent storage 18, network adaptor 28, and input/output (I/O) interface(s) 26. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses or a crossbar switch.

Memory 16 and persistent storage 18 are computer readable storage media. In this embodiment, memory 16 includes persistent storage 18, random access memory (RAM) 20, cache 22 and program module 24. In general, memory 16 can include any suitable volatile or non-volatile computer readable storage media. Cache 22 is a fast memory that enhances the performance of processing unit 14 by holding recently accessed data, and data near recently accessed data, from memory 16. As will be further depicted and described below, memory 16 may include at least one of program module 24 that is configured to carry out the functions of embodiments of the invention.

The program/utility, having at least one program module 24, may be stored in memory 16 by way of example, and not limiting, as well as an operating system, one or more application programs, other program modules, and program data. Each of the operating systems, one or more application programs, other program modules, and program data or some combination thereof, may include an implementation of a networking environment. Program module 24 generally carries out the functions and/or methodologies of embodiments of the invention, as described herein.

Program instructions and data used to practice embodiments of the present invention may be stored in persistent storage 18 and in memory 16 for execution by one or more of the respective processing unit 14 via cache 22. In an embodiment, persistent storage 18 includes a magnetic hard disk drive. Alternatively, or in addition to a magnetic hard disk drive, persistent storage 18 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Network adaptor 28, in these examples, provides for communications with other data processing systems or devices. In these examples, network adaptor 28 includes one or more network interface cards. Network adaptor 28 may provide communications through the use of either or both physical and wireless communications links. Program instructions and data used to practice embodiments of the present invention may be downloaded to persistent storage 18 through network adaptor 28.

I/O interface(s) 26 allows for input and output of data with other devices that may be connected to each computer system. For example, I/O interface 26 may provide a connection to external devices 30 such as a keyboard, keypad, a touch screen, and/or some other suitable input device. External devices 30 can also include portable computer readable storage media such as, for example, thumb drives, portable optical or magnetic disks, and memory cards. Software and data used to practice embodiments of the present invention can be stored on such portable computer readable storage media and can be loaded onto persistent storage 18 via I/O interface(s) 26. I/O interface(s) 26 also connect to display 32.

Display 32 provides a mechanism to display data to a user and may be, for example, a computer monitor or virtual graphical user interface.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Figure 6:
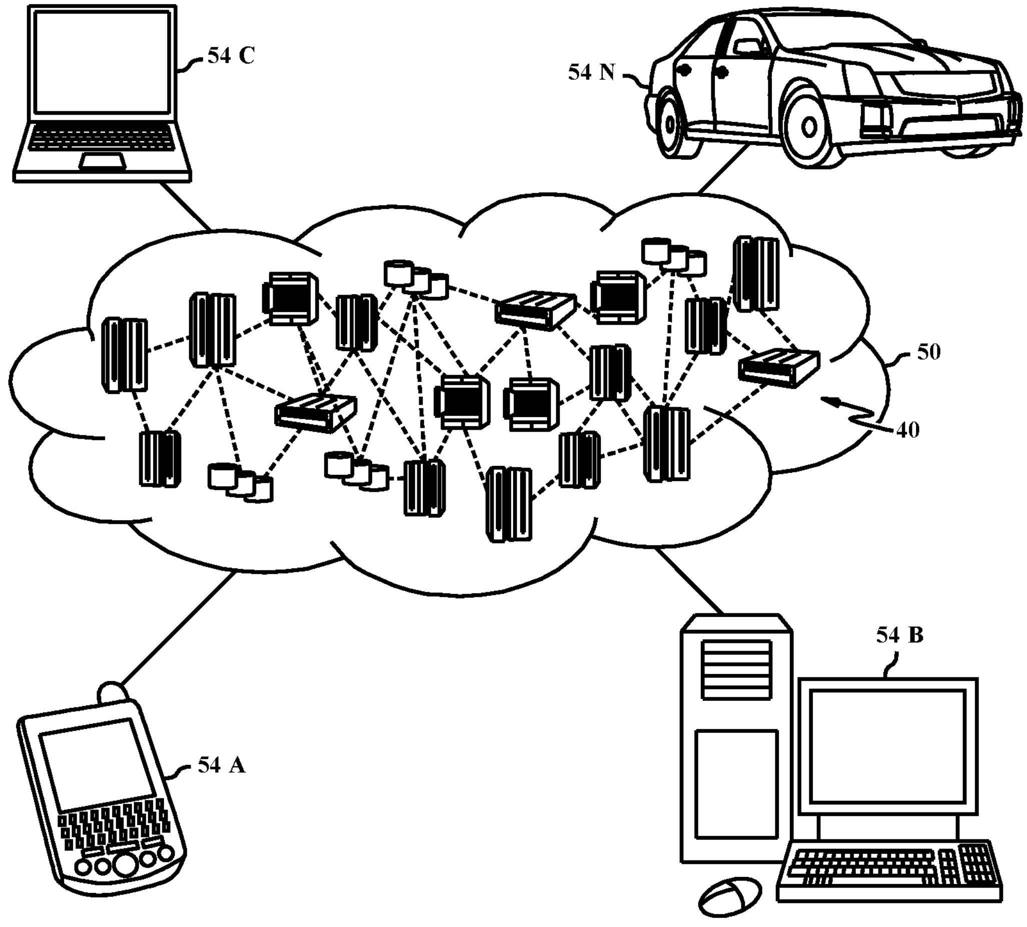
FIG. 6 is a diagram depicting a cloud computing environment 50, in accordance with an embodiment of the present invention.
Figure 7:
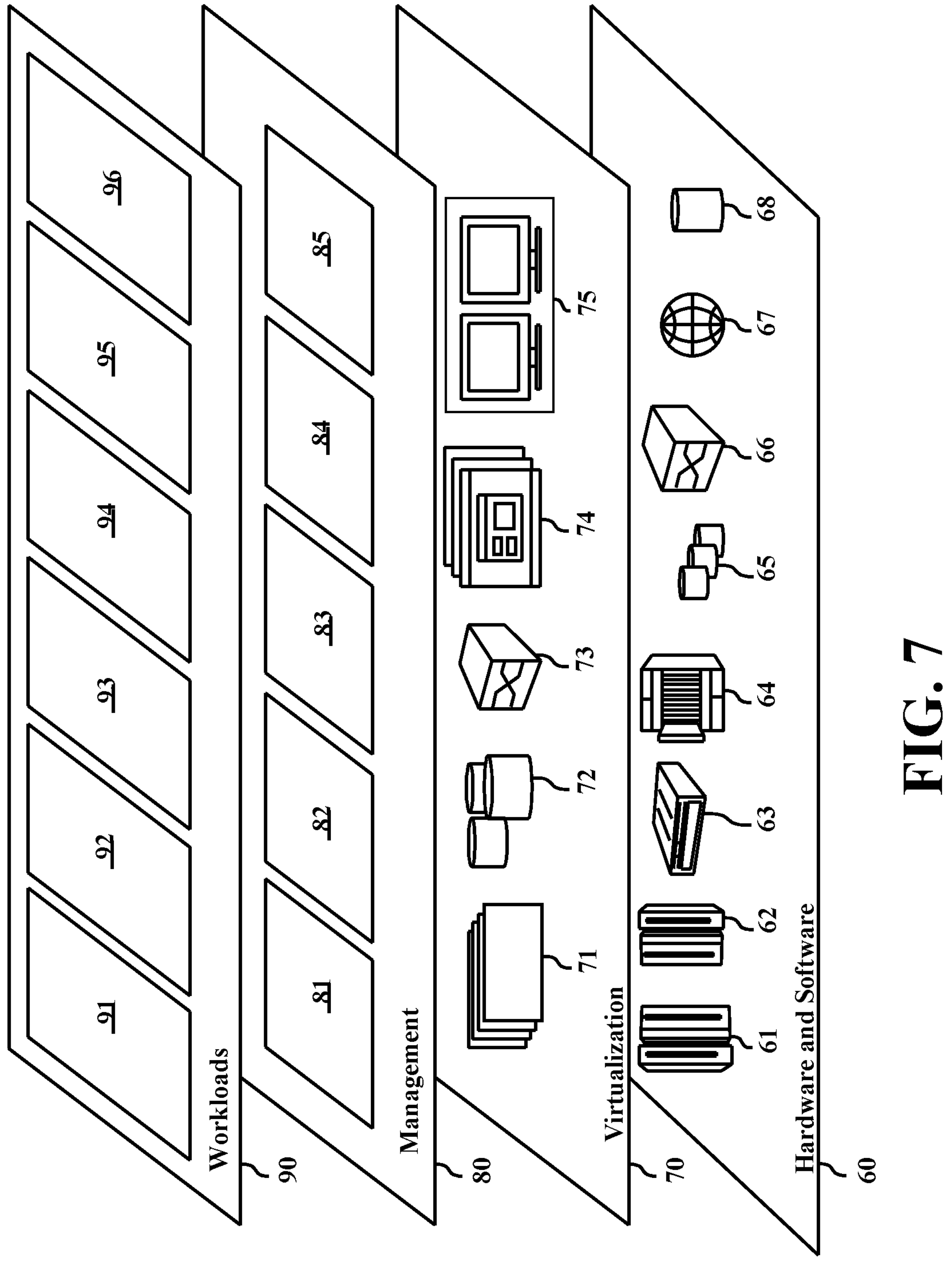
FIG. 7 is a functional block diagram depicting abstraction model layers, in accordance with an embodiment of the present invention.

Referring now to FIG. 6, a set of functional abstraction layers provided by cloud computing environment 50 (depicted in FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 include hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and generating an explanation for a change request risk classification 96.

It should be noted that the embodiments of the present invention may operate with a user's permission. Any data may be gathered, stored, analyzed, etc., with a user's consent. In various configurations, at least some of the embodiments of the present invention are implemented into an opt-in application, plug-in, etc., as would be understood by one having ordinary skill in the art upon reading the present disclosure.

What is claimed is:

1. A computer-implemented method for generating actionable change request risk classifications, the computer-implemented method comprising:

extracting, by a processor, a plurality of features from a change request, based on a trained model;

classifying, by the processor, using a classification model, the change request as risky, based on the plurality of features, wherein the change request classified as risky indicates that implementation of the risky change request results in future technical issues in a computer system that cause the computer system to operate in an unintended manner; and after the change request is classified as risky by the classification model:

identifying, by the processor, a plurality of candidate historical change requests, wherein at least one feature, of each candidate historical change request of the plurality of candidate historical change requests, corresponds to at least one feature of the plurality of features that is extracted from the change request based on the trained model, and the plurality of candidate historical change requests has the same classification as the change request;

analyzing, by the processor, based on the identifying, the classification model, wherein the analyzing includes determining one or more nodes, within the classification model, activated by the plurality of features during the classification of the change request;

detecting, by the processor, based on the analyzing, one or more features among the plurality of features of the change request, wherein the detected one or more features had an impact on the classification of the change request;

identifying, by the processor, a candidate historical change request from the plurality of candidate historical change requests, wherein the candidate historical change request among the plurality of candidate historical change requests has highest overlap with the detected one or more features;

controlling, by the processor, presentation of the identified candidate historical change request to a user; and preventing the implementation of the change request classified as risky thereby preventing, the computer system from operating in the unintended manner.

2. The computer-implemented method of claim 1, wherein the classification model is trained based on a plurality of historical change requests, each historical change request of the plurality of historical change requests is labeled as one of risky or not risky, and the plurality of historical change requests includes the plurality of candidate historical change requests.

3. The computer-implemented method of claim 1, wherein the identifying of the plurality of candidate historical change requests comprises searching, by the processor, a historical change request database via an elastisearch algorithm.

4. The computer-implemented method of claim 1, wherein the detecting of the one or more features is based on an explainability algorithm.

5. The computer-implemented method of claim 4, wherein the explainability algorithm is based on a local interpretable model-agnostic explanation.

6. The computer-implemented method of claim 1, further comprising transforming the change request into a computer readable format, based on a natural language processing model.

7. A computer system for generating actionable change request risk classifications, the computer system comprising:

a processor;

a readable storage media; and computer program instructions to:

extract a plurality of features from a change request, based on a trained model;

classify, using a classification model, the change request as risky, based on the plurality of features, wherein the change request classified as risky indicates that implementation of the risky change request results in future technical issues in a system that cause the system to operate in an unintended manner; and after the change request is classified as risky by the classification model:

identify a plurality of candidate historical change requests, wherein at least one feature, of each candidate historical change request of the plurality of candidate historical change requests, corresponds to at least one feature of the plurality of features that is extracted from the change request based on the trained model, and the plurality of candidate historical change requests has the same classification as the change request;

analyze, based on the identification, the classification model, wherein the analysis includes determination of one or more nodes, within the classification model, activated by the plurality of features during the classification of the change request;

detect, based on the analysis, one or more features among the plurality of features of the change request, wherein the detected one or more features had an impact on the classification of the change request;

identify a candidate historical change request from the plurality of candidate historical change requests, wherein the candidate historical change request among the plurality of candidate historical change requests has highest overlap with the detected one or more features;

control presentation of the identified candidate historical change request to a user; and prevent the implementation of the change request classified as risky thereby prevent the system from operating in the unintended manner.

8. The computer system of claim 7, wherein the classification model is trained based on a plurality of historical change requests, each historical change request of the plurality of historical change requests is labeled as one of risky or not risky, and the plurality of historical change requests includes the plurality of candidate historical change requests.

9. The computer system of claim 7, wherein the identification of the plurality of candidate historical change requests further comprises the computer program instructions to search a historical change request database via an elastisearch algorithm.

10. The computer system of claim 7, wherein the detection of the one or more features is based on an explainability algorithm.

11. The computer system of claim 10, wherein the explainability algorithm is based on a local interpretable model-agnostic explanation.

12. The computer system of claim 7, wherein the plurality of features comprises embedding representations.

13. The computer system of claim 7, further comprising the computer program instructions to transform the change request into a computer readable format, based on a natural language processing model.

14. A computer program product for generating actionable change request risk classifications, the computer program product comprising:

one or more non-transitory computer-readable storage media; and program instructions stored on the one or more non-transitory computer-readable storage media to perform operations comprising:

extracting a plurality of features from a change request, based on a trained model;

classifying, using a classification model, the change request as risky, based on the plurality of features, wherein the change request classified as risky indicates that implementation of the risky change request results in future technical issues in a computer system that cause the computer system to operate in an unintended manner; and after the change request is classified as risky by the classification model:

identifying a plurality of candidate historical change requests, wherein at least one feature, of each candidate historical change request of the plurality of candidate historical change requests, corresponds to at least one feature of the plurality of features that is extracted from the change request based on the trained model, and the plurality of candidate historical change requests has the same classification as the change request;

analyzing, based on the identifying, the classification model, wherein the analyzing includes determining one or more nodes, within the classification model, activated by the plurality of features during the classification of the change request;

detecting, based on the analyzing, one or more features among the plurality of features of the change request, wherein the detected one or more features had an impact on the classification of the change request;

identifying a candidate historical change request from the plurality of candidate historical change requests, wherein the candidate historical change request among the plurality of candidate historical change requests has highest overlap with the detected one or more features;

controlling presentation of the identified candidate historical change request to a user; and preventing the implementation of the change request classified as risky thereby preventing the computer system from operating in the unintended manner.

15. The computer program product of claim 14, wherein the classification model is trained based on a plurality of historical change requests, each historical change request of the plurality of historical change requests is labeled as one of risky or not risky, and the plurality of historical change requests includes the plurality of candidate historical change requests.

16. The computer program product of claim 14, wherein the identifying of the plurality of candidate historical change requests comprises the program instructions to perform the operations further comprising searching a historical change request database via an elastisearch algorithm.

17. The computer program product of claim 14, wherein the detecting of the one or more features is based on an explainability algorithm.

18. The computer program product of claim 17, wherein the explainability algorithm is based on a local interpretable model-agnostic explanation.

19. The computer program product of claim 14, wherein the program instructions stored on the one or more non-transitory computer-readable storage media to perform the operations further comprises transforming the change request into a computer readable format, based on natural language processing model.

20. The computer-implemented method of claim 1, further comprising:

determining, by the processor, after the change request is classified as risky, a correspondence between the at least one feature of the plurality of candidate historical change requests and the at least one feature of the of plurality of features, wherein the plurality of features comprises vectors, and the correspondence, between the at least one feature of the plurality of candidate historical change requests and the at least one feature of the plurality of features, is determined based on the vectors within a vector space; and identifying, by the processor, based on the determined correspondence classification, the plurality of candidate historical change requests.

* * * * *